United States Patent [19]

Kroggel et al.

[11] Patent Number: 5,034,475
[45] Date of Patent: Jul. 23, 1991

[54] GRAFT POLYMERS, CONTAINING POLYVINYL ACETAL GROUPS, ON POLYURETHANE GRAFTING SUBSTRATES, PROCESSES FOR THE PREPARATION THEREOF, AND THE USE THEREOF

[75] Inventors: Matthias Kroggel; Karl-Josef Rauterkus, both of Kelkheim; Hans-Dieter Hermann, Bad Soden am Taunus, all of Fed. Rep. of Germany

[73] Assignee: Hoechst AG, Fed. Rep. of Germany

[21] Appl. No.: 424,064

[22] Filed: Oct. 19, 1989

[30] Foreign Application Priority Data

Oct. 21, 1988 [DE] Fed. Rep. of Germany ....... 3835840

[51] Int. Cl.$^5$ .................. C08F 299/06; C08F 8/00; C08G 63/91
[52] U.S. Cl. ..................... 525/455; 525/58; 525/62; 525/440; 525/454; 525/456
[58] Field of Search ............. 525/62, 454, 455, 456, 525/58, 440

[56] References Cited

U.S. PATENT DOCUMENTS

| | | | |
|---|---|---|---|
| 4,205,146 | 5/1980 | Hermann et al. | 525/61 |
| 4,751,266 | 6/1988 | Hermann et al. | 525/61 |
| 4,883,699 | 11/1989 | Aniuk et al. | 525/58 |

Primary Examiner—Melvyn I. Marquis
Assistant Examiner—Thomas Hamilton, III
Attorney, Agent, or Firm—Bierman and Muserlian

[57] ABSTRACT

Polymers with polyvinyl acetal groups, which contain acetalized polyvinyl alcohol groups on polyurethane grafting substrates and which are prepared from graft polymers, containing vinyl alcohol groups on polyurethane grafting substrates, by reaction with aldehydes according to known methods. The aldehydes used can be any known aldehydes capable of acetalization reactions.

The polyurethane grafting substrates contain at least 2 urethane groups in the molecule and units from diisocyanates and diols, and polymer radicals of units of vinyl carboxylates having 3 to 20 carbon atoms and/or hydrolysis products thereof and, if appropriate, further monomer units are grafted onto the polyurethane grafting substrates. The proportion of vinyl alcohol units in the hydrolyzed or partially hydrolyzed graft polymers before the acetalization is >10% by weight.

In the acetalized polymer, the content of residual unacetalized vinyl alcohol units is >7.5 mol %, relative to the molar content (=100 mol %) of vinyl alcohol units in the starting graft polyvinyl alcohol before acetalization.

The graft polyvinyl acetals may be used as a constituent of coating compositions, as a coating agent constituent for the diverse substrates, as a material for thermoplastically processable moldings and as an interleaving film in laminated glasses.

12 Claims, No Drawings

GRAFT POLYMERS, CONTAINING POLYVINYL ACETAL GROUPS, ON POLYURETHANE GRAFTING SUBSTRATES, PROCESSES FOR THE PREPARATION THEREOF, AND THE USE THEREOF

The invention relates to polymers with polyvinyl acetal groups, which polymers contain acetalized polyvinyl alcohol groups on polyurethane grafting substrates, to processes for the preparation thereof from graft polymers containing vinyl alcohol groups on polyurethane grafting substrates, by reaction with aldehydes, and to the use of the acetalized polymers, for example in film form for the production of laminated glasses, as binders in adhesives and paints, as coating agents and for the production of moldings.

Polyvinyl acetals, preferably polyvinyl butyrals, based on conventional polyvinyl alcohol (PVAL), are processed, inter alia, as is known, to give films which can be used in the production of laminated glasses.

The thermoplastic processing of polyvinyl acetals, in particular of polyvinyl butyrals based on PVAL, succeeds only after the admixture of effective organic plasticizers, as is known, because the commercially available products have high melting points, low flowability and low stability under thermal stresses. Examples of such plasticizers are phthalates of $(C_6-C_{10})$-alcohols, triethylene glycol di-(n-heptanoate), tri-(2-ethylhexyl) phosphate, tricresyl phosphate or mixtures of these compounds.

Plasticizer-containing mixtures of polyvinyl acetals have, however, considerable disadvantages in various applications. Thus, for example, many plasticizers have an only limited miscibility or limited compatibility with polyvinyl butyrals, so that the plasticizers can separate out of the polymer if unduly high plasticizer concentrations are used. Even in the case of compatible mixtures, the plasticizer can readily be extracted, for example on contact with solvents, which can lead to undesired changes in properties.

The present invention was therefore based on the object of providing polymers of the polyvinyl acetal type, which can be employed even without the additional use of plasticizers and, in particular, can be thermoplastically molded without an addition of plasticizer.

It has now been found, surprisingly, that the stated object can be achieved by using acetalized polymers which can be obtained by acetalizing graft polymers which contain polyvinyl alcohol groups on polyurethane grafting substrates.

The invention relates therefore to polymers containing polyvinyl acetal groups, which have been obtained from graft polymers containing polyvinyl alcohol groups on polyurethane grafting substrates by reaction with aldehyde.

According to the invention, the acetalization of the said graft polymers can be carried out by known methods, preferably in the presence of acid catalysts. Examples of acid catalysts used in aqueous media are preferably inorganic acids such as, for example, hydrochloric acid, sulfuric acid, phosphoric acid, if appropriate nitric acid, and others.

The aldehydes used are in principle all the known aldehydes capable of acetalization reactions, preferably those which have been disclosed as usable in the acetalization of PVAL. Preferably, linear and/or cycloaliphatic and/or aromatic aldehydes are used, in particular those having 1 to 20 carbon atoms. Preferred examples are benzaldehyde, formaldehyde, acetaldehyde, propionaldehyde, butyraldehyde, isononanealdehyde and optionally substituted variants of the said aldehydes. $(C_2-C_4)$-aldehydes, in particular butyraldehyde, are particularly preferred. A further preferred variant is the use of hydroxyaldehyde. The said aldehydes can be employed both alone and as mixtures of different aldehydes.

The graft polymers, used according to the invention for the acetalization, which contain polyvinyl alcohol groups on polyurethane grafting substrates, and the preparation thereof are inter alia the subject of Patent Application HOE 87/F 284 (File reference P 3,732,089.0) already filed, which is incorporated herein by reference.

The acetalization of graft polymers which contain polyvinyl alcohol groups on polyurethane grafting substrates, and the use of the thus resulting polymers containing polyvinyl acetal groups have hitherto been neither known nor suggested.

Graft polymers, containing polyvinyl acetal groups, on polyalkylene oxide grafting substrates are already known from German Auslegeschrift 1,086,435. However, these products, in particular the butyrals, are not thermally stable. In addition, they are difficult to process thermoplastically because of inadequate flowability, so that their thermoplastic molding or processing and also their use have been unable to gain any importance.

The graft polymers, used for acetalization according to the invention, contain polyurethane grafting substrates which have at least 2 urethane groups in the molecule, the number of the urethane groups per grafting substrate molecule not being subject to any particular upper limitation, so that it can assume markedly higher values than 2. Preferably, these values are in the range from 9 to 101.

Moreover, the polyurethane grafting substrates preferably have molecular weights in the range from 200 to 100,000 g/mol, especially 1,300 to 50,000 g/mol. In principle, however, the molecular weights of the polyurethane grafting substrates are not subject to any restriction.

The polyurethane grafting substrates can be prepared by conventional methods of polyurethane synthesis and are preferably synthesized with the use of catalysts, such as, for example, tertiary amines or organic tin compounds, at temperatures between 60° and 120° C., preferably between 70° and 100° C.

They are built up from diol components and diisocyanate components. In principle, all diols suitable for polyurethane synthesis can be used. Cycloaliphatic diols such as, for example, cyclohexanediols, as well as aliphatic diols having preferably 2 to 20 carbon atoms are preferred. Polyalkyleneglycols such as, for example, polypropylene oxides, polybutylene oxides, copolymers of ethylene oxide, propylene oxide and butylene oxide, preferably block copolymers thereof, are also preferred, and the so-called polyethylene glycols or polyethylene oxides, i.e. especially the a,w-dihydroxypolyethylene oxides, are particularly preferred.

Preferably, polyethylene glycols having molecular weights between 200 and 10,000 g/mol are used, polyethylene glycols having molecular weights between 400 and 1,500 g/mol being particular preferred. If appropriate, the polyethylene glycols are employed in combination with low-molecular aliphatic diols such as, for example, 1,4-butanediol, 1,3-propanediol, 1,6-hexanediol, hexylene glycol, ethylene glycol, diethylene glycol and triethylene glycol. The molar polyethylene glycol/low-molecular aliphatic diol ratio is preferably 1:0.1 to 1:0.7.

The diisocyanate components used are aromatic diisocyanates, preferably having up to 25 carbon atoms, such as, for example, m- and p-diisocyanatoxylene, 2,4-diisocyanatotoluene, 2,6-diisocyanatotoluene or mixtures of the last two isomers, 1,5-diisocyanatonaphthalene,
4,4'-diisocyanatodiphenylmethane and 4,4'-diisocyanatophenyl benzyl ether.

Preferably, aliphatic and/or cycloaliphatic diisocyanates, preferably having up to 25 carbon atoms, are used. Examples of preferred aliphatic diisocyanates are those having 2 to 12 carbon atoms in the aliphatic moiety, such as, for example, ethylene diisocyanate, propylene diisocyanate, tetramethylene diisocyanate and 2,2,4-trimethylhexamethylene diisocyanate. Examples of preferred cycloaliphatic diisocyanates are 1,4-diisocyanatocyclohexane, 4,4'-methylene-bis-(cyclohexyl diisocyanate), 1-methyl-2,4-cyclohexyl diisocyanate, 1-methyl-2,6-cyclohexyl diisocyanate and 1,3-bis-(isocyanatomethyl)-cyclohexane.

The use of 1,6-hexamethylene diisocyanate and/or especially isophorone diisocyanate is particularly preferred.

The molar diol component to diisocyanate component ratios are preferably between 1:0.99 and 1:0.5, especially between 1:0.98 and 1:0.7. The mean molecular weights of the polyurethanes are preferably between 200 and 100,000 g/mol, in particular between 1,300 and 50,000 g/mol and particularly preferably between 3,000 and 25,000 g/mol. The mean molecular weights (weight average) can be determined by conventional experimental methods and/or by calculation methods. Monoisocyanates can be used to regulate the molecular weight in the preparation of the polyurethane grafting substrates.

It must be pointed out that, for example in the case of a given molecular weight for the grafting substrate, the number of urethane groups thereof depends directly on the molecular weights of the diol components or diisocyanate components used.

The molecules of the polyurethane grafting substrates can, inter alia, contain free OH groups or esterified or etherified OH groups as the terminals groups, and/or their OH groups can have been reacted with isocyanate radicals to give urethane groups.

Vinyl carboxylates having 3 to 20 carbon atoms are preferably used for grafting onto the polyurethane grafting substrate. Vinyl acetate and/or vinyl propionate, especially vinyl acetate, are particularly preferred. Mixtures of vinyl acetate and/or vinyl propionate and vinyl Versatates are also preferred.

Preferably, vinyl acetate is grafted on. Particularly in view of the partial or complete hydrolysis, required according to the invention, of the graft polymers after the graft polymerization, the additional use of vinyl propionate apart from vinyl acetate in grafting is advantageous. Moreover, copolymerisable mixtures of vinyl carboxylates can be grafted, preferably mixtures of vinyl acetate and vinyl Versatates, in which case the proportion of vinyl Versatates can be 0.2 to 10% by weight, preferably 0.5 to 5% by weight, relative to the vinyl acetate proportion. Grafting with different vinyl carboxylates in the form of block copolymers, if appropriate in combination with further ethylenically unsaturated and copolymerizable monomers, can be advantageous.

Thus, the vinyl carboxylates can also grafted on together with other ethylenically unsaturated and copolymerizable monomers, preferably with unsaturated carboxylic acids and/or the esters of unsaturated carboxylic acids such as, for example, maleic acid, itaconic acid, mesaconic acid, crotonic acid, acrylic acid or esters thereof, and also with ethylene within certain quantitative ratios. The graft polymers thus obtained can then be partially or completely hydrolyzed.

The grafting is carried out with the use of grafting catalysts which start free-radical chains, and all free-radical formers which are soluble in the monomers, the monomer mixture or the monomer solution can preferably be used for this purpose. In particular organic per compounds, such as peroxides and percarbonates, as well as organic azo compounds have proven suitable for the grafting, and preferably azo-bis-isobutyronitrile or tert.-butylperoxy 2-ethylhexanoate and particularly preferably dibenzoylperoxide are used. The grafting reaction is carried out in the presence of preferably 0.013 to 1.3 mol %, especially 0.026 to 0.27 mol %, relative to the quantity of monomers, of catalyst forming free radicals.

The resulting graft polymers can be converted by hydrolysis, alcoholysis or transesterification into partially or completely hydrolyzed products, the degree of hydrolysis being, according to the invention, preferably at least 10 mol %, especially more than 70 mol % and particularly preferably 85 to 99 mol %, relative to the mol number of the grafted-on hydrolysable vinyl ester monomer units in the graft polymer.

The vinyl ester content of the hydrolyzed or partially hydrolyzed graft polymers is, according to the invention, preferably 0.1 to 85%, relative to the hydrolyzed or partially hydrolyzed graft polymer, and particularly preferably 0.5 to 80% by weight, especially 1 to 30% by weight.

The content of vinyl alcohol units in the hydrolyzed or partially hydrolyzed and unacetalized graft polymers is, according to the invention, preferably >10% by weight, especially 15 to 85% by weight and particularly preferably 30 to 80% by weight, relative to the hydrolyzed or partially hydrolyzed, unacetalized graft polymer.

The grafting reaction can take place, for example, in emulsion or in suspension, but is preferably carried out in solution or in bulk.

The monomers to be grafted on are preferably fed continuously or discontinuously to the polyurethane grafting substrate introduced previously into the reaction vessel, it being advantageous to select the feed rate and the process parameters in such a way that the formation of ungrafted homopolymers is precluded as far as possible. The monomers can, if they are in the liquid form, be added in bulk or also as a solution. The catalyst is preferably dissolved in the monomer liquid or monomer solution and fed in together with the latter. However, it can also be introduced beforehand into the reaction vessel, together with the polyurethane grafting substrate, at least partially. The grafting reaction is preferably carried out at temperatures between 40° and 120° C., in particular between 65° and 100° C., depending on the catalyst used and, especially in the case of bulk polymerization, as a function of the polyurethane grafting substrate used. As an alternative, batch graft polymerization is also possible, but this process can frequently lead to mixtures of graft polymers and homopolymers from the monomers to be grafted on.

The rise in viscosity of the reaction mixture, taking place during the graft polymerization, particularly during bulk polymerization, can frequently lead to processing problems, which can be overcome, for example, by continuous or discontinuous addition of solvents. Preferably suitable solvents are monohydric alcohols, especially methanol and ethanol, which, if appropriate, can also be used already for dissolving the monomers which are to be grafted.

In solution polymerization, the solvent proportion in the reaction mixture should preferably be below 20% by weight, especially below 10% by weight, relative to the reaction mixture.

After removal of the residual monomers (in most cases by azeotropic distillation with methanol), the graft polymers obtained can be precipitated in their unhydrolyzed form by introducing the mixture into water. However, after dilution with a solvent, preferably with methanol, they can also be converted by usual methods, known from the literature, directly into the desired partially or completely hydrolyzed products by means of acid catalysts (for example hydrochloric acid, phosphoric acid, p-toluenesulfonic acid and the like) or preferably with the use of alkaline catalysts (for example NaOH, KOH, $NaOCH_3$, $KOCH_3$ and the like), if appropriate with additional use of water.

Preferably, the alkali metal hydroxide addition is 0.1 to 20 mol %, in particular 0.5 to 10 mol %, relative to the quantity of grafted-on and hydrolyzable monomer units. The hydrolysis is preferably carried out between 20° and 60° C., and in particular by alkaline alcoholysis in a lower alkanol, preferably in methanol.

If the graft polymers also contain, in addition to the grafted-on vinyl ester units, further grafted-on comonomer units of ethylenically unsaturated monomers which are hydrolyzable, these can also be hydrolyzed in the hydrolysis reaction or alcoholysis.

It has also been found that, in the graft polymers, the vinyl ester units having preferably 1 to 4 carbon atoms in the carboxylic acid moiety are particularly readily susceptible to alkaline hydrolysis or alcoholysis, whereas vinyl ester units having longer-chain carboxylic acid radicals, preferably having longer-chain branched carboxylic acid radicals, are more resistant to alkaline hydrolysis or alkaline alcoholysis, and this can be important for the preparation of a number of partially hydrolyzed graft polymers.

The relevant synthesis parameters or synthesis variants and degrees of hydrolysis can in each case be selected and mutually matched in such a way that water-soluble or water-insoluble hydrolyzed or partially hydrolyzed graft polymers having the desired grafted-on and acetalizable polyvinyl alcohol groups are obtained.

The property pattern of the water-soluble or water-insoluble graft polymers used according to the invention for the acetalization and containing polyvinyl alcohol groups is influenced, inter alia, by the molecular weight and the structure of the polyurethane grafting substrates, by the nature, composition and quantity of grafted-on monomer units and by the molecular weight and the degree of hydrolysis of the graft polymer.

In principle, all the graft polymers, mentioned or discussed above and containing polyvinyl alcohol groups on polyurethane grafting substrates, can be converted by polymer-analogous reactions with aldehydes into corresponding graft polymers containing polyvinyl acetal groups. The acetalization reactions can be carried out, for example, in aqueous media or in organic solvents, which can also contain water.

The invention therefore also relates to processes for preparing the graft polymers according to the invention, containing polyvinyl acetal groups on polyurethane grafting substrates.

To improve clarity, the graft polymers which are to be acetalized according to the invention and contain polyvinyl alcohol groups on polyurethane grafting substrates are, where appropriate, called below "graft polyvinyl alcohol" or "graft PVAL" in brief, and their acetalization products are called "graft polyvinyl acetal" or "graft PV acetal".

The water-soluble graft polyvinyl alcohols are converted with aldehydes to acetals preferably in aqueous solutions with addition of acid catalysts. In this case, it is possible, for example, either to add one of the acid catalysts, already mentioned above by way of example, to a mixture of aqueous graft PVAL solution and aldehyde or to add the aldehyde to a mixture of aqueous graft PVAL solution and acid catalyst. One-pot reactions are also feasible, but can frequently lead to lumps of the resulting reaction product being formed. All acid catalysts and all aldehydes, which have been disclosed as suitable for the corresponding acetalization of conventional polyvinyl alcohol and, in addition, were also already described in detail above, are in principle suitable for the acetalization of the graft polyvinyl alcohols, according to the invention in an aqueous medium.

During the acetalization in aqueous media, the additional use of emulsifiers can have an advantageous effect on the course of the acetalization. Particularly suitable emulsifiers are preferably anionic emulsifiers from the group comprising $(C_8-C_{20})$-alkanesulfonic acids, fluorinated fatty acids or fluorinated long-chain sulfonic acids, long-chain alkylsulfosuccinates as well as mixtures of these emulsifiers.

For producing the graft polyvinyl acetals according to the invention in aqueous medium, preferably 1 to 50% by weight aqueous solutions, in particular 5 to 20% by weight aqueous solutions, of graft polyvinyl alcohols according to the invention are prepared by known methods and preferably hot, the acid catalyst is added, the solutions are then cooled to temperatures below 15° C. and the acetalization reaction is carried out by controlled addition of the aldehyde, preferably in the course of 5 to 300 minutes, with vigorous stirring. If desired, the acetalization reaction can also be carried out as a batch reaction. The quantity of the aldehyde to be added depends on the desired degree of acetalization and the stoichiometric requirement which can be calculated therefrom. Since the aldehyde conversion is in most cases not complete, as is known, an excess of aldehyde is preferably used. With particular preference, the aldehyde is used in an excess of up to 30 mol %, in particular 10 to 20 mol %.

In a particularly preferred process variant, the acetalization is initiated in the aqueous graft polyvinyl alcohol/acid catalyst starting solution at temperatures from 0° to 5° C., the aqueous solution being left to stand at rest before the start of the reaction for preferably at least 30 minutes at the low reaction temperature, whereupon the graft polyvinyl acetal formed soon precipitates in most cases in the form of a powder. To complete the reaction, the reaction mixture is warmed slowly to room temperature and, if necessary, this is followed by further reaction, lasting for about 1 to 3 hours, at higher temperatures, for example at 25° to 70° C. If necessary, the reaction is carried out with an addition of emulsifier, in which case the emulsifier can be added either to the starting solution or during the course of the reaction and/or during the further reaction. The quantity of acid catalyst to be used depends, inter alia, on the desired degree of acetalization and can preferably be up to 1.1 mol equivalent, relative to the molar content of vinyl alcohol units.

The graft polyvinyl acetal formed, which preferentially separates in the form of a powder from the aqueous reaction solution, is filtered off from the liquid phase with suction, washed with water adjusted to a slightly alkaline reaction (pH 9 to 12) and dried. Acetalization products which do not separate from the aqueous reaction solution can be isolated after the addition of precipitants, purified and dried.

In principle, the acetalization of all graft polyvinyl alcohols according to the invention can also be carried out in organic solvents. With the graft PVALs insoluble in organic solvents, it can be carried out as a two-phase or multi-phase reaction (heterogeneous reaction), and with graft PVALs soluble in organic solvents, it can be carried out as a single-phase reaction. For the acetalization of the graft PVALs according to the invention in organic solvents, all those solvents, acid catalysts and aldehydes can in principle be used which have been disclosed as suitable for the corresponding acetalization of conventional polyvinyl alcohol, as is also already described above in detail.

Examples of suitable solvents are preferably xylenes, toluene, chloroform and methylene chloride, but water-miscible solvents are used with particular preference, in particular water-soluble alcohols, preferably ethanol and/or methanol. Aqueous dilutions of water-soluble or water-dilutable solvents can also be used.

The acid catalysts used are preferably organic sulfonic acids such as, for example, toluenesulfonic acids, and also mineral acids such as, for example, sulfuric acid, hydrochloric acid and, if appropriate, nitric acid, as well as a number of further strong organic and/or inorganic acids.

For preparing the graft polyvinyl acetals according to the invention in organic solvents, the acid catalyst, the aldehyde and the graft PVAL are slurried or suspended or dispersed or dissolved in the organic solvent, and the mixture is heated under reflux. If desired, the aldehyde can also be added during the course of the reaction. The graft PVALs insoluble in the organic solvent then go into solution with the progress of the acetalization.

After completion of the acetalization reaction, the reaction product is precipitated, preferably in the form of finely dispersed powder, by addition of non-polar solvents such as, for example, pentane, hexane, heptane and the like, to the reaction solution, or by pouring the reaction solution into ice-cold water or ice-cold water-/alcohol mixture, filtered off with suction from the liquid phase, washed with water adjusted to a slightly alkaline reaction (pH 9 to 12) and dried.

The degree of acetalization of the graft polyvinyl acetals obtained according to the invention is preferably within such a range that the content of unacetalized vinyl alcohol units in the graft polyvinyl acetal is preferably >7.5 mol %, especially 10 to 60 mol % and particularly preferably 20 to 45 mol %, each relative to the molar content (=100 mol %) of vinyl alcohol units in the starting graft polyvinyl alcohol before the acetalization.

The graft polyvinyl acetals according to the invention are suitable, both in the pure form and as a blend with suitable organic plasticizers, for the production of films by thermoplastic molding. Suitable plasticizers are in principle all plasticizers which can be used for the commercially available polyvinyl acetals, preferably, for example, triethylene glycol di-(n-heptanoate), and also adipates, phthalates, phosphates and the like.

Furthermore, the graft polyvinyl acetals according to the invention can also be blended with commercially available polyvinyl acetals, preferably in a weight ratio from 99:1 to 1:99, especially 95:5 to 5:95 and particularly preferably 80:20 to 20:80. Blends of this type can also be obtained when mixtures of graft PVAL and commercially available PVAL, preferably in a weight ratio from 99:1 to 1:99, especially 95:5 to 5:95 and particularly preferably 80:20 to 20:80, are acetalized according to the invention.

Graft polyvinyl acetals obtained both by blending with commercially available polyvinyl acetals and by acetalization of mixtures of graft PVAL and commercially available PVAL can likewise be processed thermoplastically into films, if appropriate with the additional use of plasticizers.

Graft polyvinyl butyral films according to the invention and their use for the production of laminated glasses are preferred. In the processing of graft polyvinyl butyrals or blends thereof with commercially available polyvinyl butyrals to give films, the film properties such as, for example, the film tear strength, the film extensibility, the blocking behavior and the like can be influenced within a wide scope.

Due to their good adhesion properties to diverse materials, preferably to metals, graft polyvinyl acetals according to the invention can advantageously be used as coating compositions, and such coatings can be applied both from polymer solutions and from the polymer melt. By contrast, commercially available polyvinylbutyrals can in general not be applied from the melt without addition of organic plasticizers.

Graft polyvinyl acetals according to the invention can also be crosslinked by various methods. Thus, cross-linkings can be obtained, for example, by applying reactive multifunctional compounds such as, for example, isocyanates, acid chlorides and the like, or also by crosslinkings initiated by free radicals such as, for example, by photochemical or thermal initiation in the presence of free-radical formers or monomers polymerizable by free radicals. Due to these properties leading to crosslinkings, the graft polyvinyl acetals according to the invention are also suitable as binders, for example in solvent-based paint formulations.

Due to their surprising non-corrosive properties, the graft polyvinyl acetals according to the invention also represent, in particular, interesting coating compositions for metals, preferably for iron and steel.

The invention therefore also relates to the use of the graft polyvinyl acetals according to the invention, inter alia in all the fields of application mentioned in the present description.

Thus, the graft polyvinyl acetals according to the invention can advantageously also be used in numerous fields of application, in which usually known polyvinyl acetals are used, preferably, for example, as binders for pigments, for the production of printing inks, of hot-melt adhesives, of solvent-containing adhesives and as binders for ceramic powders, preferably for the production of high-grade ceramic electronic components. They are also suitable as a binder and/or a coating agent constituent for inorganic and/or organic fibers, filaments, fiber nonwovens, textile structures, cellulose materials, paper and the like.

Depending on the application, the graft polyvinyl acetals according to the invention can be mixed with conventional additives such as, for example pigments, dyes, plasticizers, solvents, adhesion regulators and stabilizers.

As already mentioned above, an additional use of plasticizers in the thermoplastic molding of graft polyvinyl acetals according to the invention is not necessary in principle, even though it can be advantageous in some cases. In the latter case, however, for example with graft polyvinyl butyrals according to the invention, the quantities of plasticizer applied are markedly lower than for comparable known polyvinyl butyrals.

As stabilizers, the phenolic compounds used in the known polyvinyl butyrals can be used, such as, for example, 2,4-di-tert.-butyl-p-cresol, phosphites such as trisnonyl-phenyl phosphite, and the like.

The addition of the said additives can in many cases be made either before or during or after the preparation of the graft polyvinyl acetals according to the invention.

The invention is explained in more detail by the examples which follow.

EXAMPLES 1-4

Preparation of polyurethane grafting substrates (PU)

Example 1

The diol component, comprising a mixture of polyethylene glycol of molecular weight 1,500 (=PEG 1500) and 1,4-butanediol (=1,4-Bu) in a molar ratio of PEG 1500:1,4-Bu=1:0.43 and the catalyst composed of 1,4-dimethylpiperazine in a quantity of 0.48 mol %, relative to the molar quantity of the diisocyanate used, are initially introduced into a reaction vessel with a stirrer unit under a nitrogen atmosphere, and the mixture is heated to a reaction temperature of 72° C. The diisocyanate component, comprising 0.9 mol of isophorone diisocyanate per mol of diol component mixture, is then fed in in such a way that the temperature of the reaction mixture does not exceed 100° C. After complete addition of the diisocyanate component, this is followed by a further reaction time of about 2 hours at about 80° to 100° C. with stirring and under a nitrogen atmosphere, in order to complete the reaction.

The completion of the conversion and hence the end of the reaction can be detected by analysis of the diisocyanate concentration by conventional methods known from the literature (for example IR spectroscopy, titration).

The diol component/diisocyanate component molar ratio is 1:0.9 and the molecular weight, calculated from this, of the resulting polyurethane (PU), (=polyurethane grafting substrate) is 12,770 g/mol.

Example 2

The procedure followed is as in Example 1, but with the following modifications:

PEG 1500 is omitted, and a mixture of polyethylene glycol of molecular weight 600 (=PEG 600) and 1,4-butanediol (=1,4-Bu) in a molar ratio of PEG 600:1,4-Bu = 1:0.43 is used as the diol component, and the reaction mixture is heated to a reaction temperature of 80° C. instead of 72° C.

The diol component/diisocyanate component molar ratio is 1:0.9 and the molecular weight, calculated from this, of the resulting polyurethane (PU) (=polyurethane grafting substrate) is 6,470 g/mol.

Example 3

The procedure followed is as in Example 1, but with the following modifications:

PEG 1500 is omitted, and a mixture of polyethylene glycol of molecular weight 600 (=PEG 600) and 1,4-butanediol (=1,4-Bu) in a molar ratio of PEG 600 1,4-Bu=1:0.43 is used as the diol component, and the reaction mixture is heated to a reaction temperature of 78° C. instead of 72° C.

The diol component/diisocyanate component molar ratio is 1:0.96 and the molecular weight, calculated from this, of the resulting polyurethane (PU) (=polyurethane grafting substrate) is 16,510 g/mol.

Example 4

The procedure followed is as in Example 1, but with the following modifications:

PEG 1500 is omitted, and a mixture of polyethylene glycol of molecular weight 600 (=PEG 600) and 1,4-butanediol (=1,4-Bu) in a molar ratio of PEG 600:1,4-Bu = 1:0.67 is used as the diol component, and the reaction mixture is heated to a reaction temperature of 78° C. instead of 72° C.

The diol component/diisocyanate component molar ratio is 1:0.97 and the molecular weight, calculated from this, of the resulting polyurethane (PU) (=polyurethane grafting substrate) is 18,328 g/mol.

Examples 5 to 8

Preparation of polyvinyl acetate graft polymers polyurethane grafting substrates

Example 5

1428 g of the polyurethane grafting substrate (PU) obtained in Example 1 are heated to a temperature of 73° C. in a reaction vessel under a nitrogen atmosphere. The monomeric vinyl acetate to be grafted on is, together with the free-radical initiator, 0.2 mol % of dibenzoyl peroxide in the present case, relative to the molar quantity of the monomeric vinyl acetate employed, dissolved in methanol and the mixture is added so slowly to the polyurethane grafting substrate (PU) that, as far as possible, no formation of ungrafted vinyl acetate homopolymer takes place. The temperature of the reactive polymerization mass should not exceed 120° C., preferably 100° C. The addition time is 420 minutes and the further reaction time is 45 minutes. 3.5 g of monomeric vinyl acetate are used per g of polyurethane grafting substrate (PU).

After the end of the further reaction, any excess residual monomer which may be present is removed by azeotropic distillation with methanol.

The resulting polyvinyl acetate graft polymer contains 77.1% by weight of grafted-on polyvinyl acetate and shows an intrinsic viscosity number $[\eta]$ of 18.8, measured in tetrahydrofuran solution at 25° C. in an Ostwald viscometer. The molecular weight, determined by calculation from the conversion, of the graft polymer is 55,860 g/mol.

Example 6

The procedure followed is as in Example 5, but with the following modifications:

Instead of the polyurethane grafting substrate (PU) of Example 1, 1428 g of polyurethane grafting substrate (PU) of Example 2 are used, and the mixture is heated to 75° C. instead of 73° C.

4 g of monomeric vinyl acetate are used per g of PU.

The resulting polyvinyl acetate graft polymer contains 75% by weight of grafted-on polyvinyl acetate, [η] is 19.2 and the molecular weight is 25,928 g/mol.

Example 7

The procedure followed is as in Example 5, but with the following modifications:

Instead of the polyurethane grafting substrate (PU) of Example 1, 1428 g of polyurethane grafting substrate (PU) of Example 3 are used, and the mixture is heated to 75° C. instead of 73° C.

2.32 g of monomeric vinyl acetate are used per g of PU, and the addition time is 390 minutes instead of 420 minutes.

The resulting polyvinyl acetate graft polymer contains 8.2% by weight of grafted-on polyvinyl acetate, [η] is 20.9 and the molecular weight is 51,946 g/mol.

Example 8

The procedure followed is as in Example 5, but with the following modifications:

Instead of the polyurethane grafting substrate (PU) of Example 1, 1428 g of polyurethane grafting substrate (PU) of Example 4 are used, and the mixture is heated to 75° C. instead of 73° C.

3.16 g of monomeric vinyl acetate are used per g of PU, and the addition time is 300 minutes instead of 420 minutes.

The resulting polyvinyl acetate graft polymer contains 75.2% by weight of grafted-on polyvinyl acetate, [η] is 27.8 and the molecular weight is 73,973 g/mol.

Examples 9 to 12

Preparation of graft polymers containing polyvinyl alcohol groups on polyurethane grafting substrates

Example 9

The graft polymer obtained in Example 5 is transesterified or hydrolyzed in methanol solution.

For this purpose, the graft polymer is dissolved to give a methanol solution containing 50% by weight of solids, and 5 mol % of NaOH, relative to the molar quantity of the grafted-on vinyl acetate units contained in the graft polymer, in a 10% by weight solution in methanol, is added at room temperature.

After a reaction time of 11 minutes at room temperature, gel formation occurs in the reaction mass, and the hydrolysis reaction is complete after a reaction time of 45 minutes. The gel-like hydrolysis product obtained is granulated in a conventional mill, and the granules are washed with methanol with addition of acetic acid until the pH value reaction is neutral, and dried. The degree of hydrolysis of the hydrolysis product obtained is 97.4 mol %. Its content of vinyl alcohol units is 41.3% by weight. It can be used without further purification for the acetalization according to the invention.

Example 10

The procedure followed is as in Example 9, but with the following modifications:

Instead of the polyvinyl acetate graft polymer of Example 5, the polyvinyl acetate graft polymer of Example 6 is used. The gel formation time is 6 minutes instead of 11 minutes.

The hydrolysis product has a degree of hydrolysis of 98.2 mol % instead of 97.4 mol %, and its content of vinyl alcohol units is 58.9% by weight instead of 41.3% by weight.

Example 11

The procedure followed is as in Example 9, but with the following modifications:

Instead of the polyvinyl acetate graft polymer of Example 5, the polyvinyl acetate graft polymer of Example 7 is used. 1.9 mol % of NaOH instead of 5 mol % of NaOH are used, the gel formation time is 15 minutes instead of 11 minutes and the reaction time is 120 minutes instead of 45 minutes.

The hydrolysis product has a degree of hydrolysis of 98 mol % instead of 97.4 mol %, and its content of vinyl alcohol units is 50.8% by weight instead of 41.3% by weight.

Example 12

The procedure followed is as in Example 9, but with the following modifications:

Instead of the polyvinyl acetate graft polymer of Example 5, the polyvinyl acetate graft polymer of Example 8 is used.

1.9 mol % of NaOH instead of 5 mol % of NaOH is used, the gel formation time is 13 minutes instead of 11 minutes, and the reaction time is 120 minutes instead of 45 minutes.

The hydrolysis product has a degree of hydrolysis of 98.7 mol % instead of 97.4 mol %, and its content of vinyl alcohol units is 58.9% by weight instead of 41.3% by weight.

Examples 13–16

Preparation of graft polyvinyl acetals in aqueous solution

Preparation of polymers with polyvinyl acetal groups, which contain acetalized polyvinyl alcohol groups on polyurethane grafting substrates and which, where appropriate, are below called "graft polyvinyl acetals" or "graft polyvinyl butyrals" or "graft PV butyral" in brief, by reaction of aldehydes such as, for example, butyraldehyde, with graft polymers which contain polyvinyl alcohol groups on polyurethane grafting substrates and, where appropriate, are below called "graft polyvinyl alcohol" or "graft PVAL" in brief, in aqueous solution.

Example 13

400 g of graft PVAL of Example 9 are dissolved at 85° C., together with 0.84 g of $C_{15}$-alkanesulfonic acid (70% by weight in water), in 5,327 g of water in a reaction vessel with a stirrer unit. The solution is then cooled to room temperature, 289.8 ml of concentrated hydrochloric acid are added and the mixture is cooled to the reaction temperature of +2° C. After the mixture has been left to stand for about 45 minutes at +2° C., 184.3 g of n-butyraldehyde are added in the course of 90 minutes, the mixture is then slowly brought to room temperature and allowed to react further for 120 minutes at 30° C. The reaction product, which has precipitated in the form of powder, is then filtered off with suction from the liquid phase, washed with weakly alkaline water and then with pure water, with the proviso that a small quantity of alkali still remains on the product, this quantity being detected by determination of the alkali titer (ml n/100 HCl/100 g of polymer).

The following analytical and technological characteristic data are determined on the graft polyvinyl butyral obtained:

The content of vinyl alcohol units in the graft PV butyral is 11.9% by weight, relative to the graft PV butyral, or 24.6 mol %, relative to the content of vinyl alcohol units (=100 mol %) in the starting graft PVAL before the acetalization. The alkali titer of the graft PV butyral is 103.2 ml of n/100 HCl/100 g of polymer.

The specific film properties of compression films of graft PV butyral, compression-molded at 160 bar and 95° C., such as, for example, the tear strength (N/mm$^2$) and extensibility (%), cannot be determined, since the films are too fragile.

The graft PV butyral is well suited for the production of hard coatings on inflexible materials, it being possible to effect the coating preferably by pressing-on from the polymer melt.

Example 14

The procedure followed is as in Example 13, but with the following modifications:

Instead of graft PVAL of Example 9, graft PVAL of Example 10 is used. 213.3 g of n-butyraldehyde instead of 184.3 g and 329.7 ml of concentrated hydrochloric acid instead of 289.8 ml are used. The reaction temperature is +1° C. instead of +2° C., and the further reaction time is 210 minutes at 30° C. instead of 120 minutes at 30° C.

The content of vinyl alcohol units in the graft PV butyral obtained is 11.1% by weight instead of 11.9% by weight or 22.5 mol % instead of 24.6 mol %. The alkali titer of the graft PV butyral is 256.9 ml of n/100 HCl/100 g of polymer instead of 103.2 ml of n/100 HCl.

The properties of compressed graft PV butyral films are similar to those of Example 13, as are the coating properties.

Example 15

The procedure followed is as in Example 13, but with the following modifications:

Instead of a graft PVAL of Example 9, graft PVAL of Example 11 is used. 164.8 g of n-butyraldehyde instead of 184.3 g and 254.8 ml of concentrated hydrochloric acid instead of 289.8 ml are used.

The reaction temperature is +3° C. instead of +2° C., and the further reaction time is 90 minutes at 40° C. instead of 120 minutes at 30° C.

The content of vinyl alcohol units in the graft PV butyral obtained is 9.7% by weight instead of 11.9% by weight or 23.7 mol % instead of 24.6 mol %. The alkali titer of the graft PV butyral is 86.7 ml of n/100 HCl/100 g of polymer instead of 103.2 ml of n/100 HCl.

The compressed graft PV butyral films have a tear strength of 12.2 N/mm$^2$ and an extensibility of 268%, in contrast to the fragile compressed films of Example 13, which are unsuitable for testing. The graft PV butyral has good coating properties.

Example 16

The procedure followed is as in Example 13, but with the following modifications:

Instead of graft PVAL of Example 9, graft PVAL of Example 12 is used. 135 g of n-butyraldehyde instead of 184.3 g and 208.7 ml of concentrated hydrochloric acid instead of 289.8 ml are used. The further reaction time is 120 minutes at 25° C. instead of 120 minutes at 30° C.

The content of vinyl alcohol units in the graft PV butyral obtained is 21.7% by weight instead of 11.9% by weight or 44.2 mol % instead of 24.6 mol %. The alkali titer of the graft PV butyral is 24.0 ml of n/100 HCl/100 g of polymer instead of 103.2 ml of n/100 HCl.

The compressed graft PV butyral films have a tear strength of 10.1 N/mm$^2$ and an extensibility of 176%, in contrast to the fragile compressed films of Example 13, which are unsuitable for testing.

The graft PV butyral has good coating properties.

Examples 17–18

Preparation of graft polyvinyl acetals in organic solvents

Example 17

75 g of graft PVAL of Example 10 are slurried or dispersed in 300 g of ethanol in a heatable stirred apparatus equipped with a reflux condenser, 31.7 g of butyraldehyde and 5 g of p-toluenesulfonic acid are added, and the mixture is heated under reflux for 300 minutes. After cooling to room temperature, the reaction mixture is poured into ice-cooled water, the graft polyvinyl butyral formed precipitating as fine particles. It is filtered off with suction from the liquid phase, washed with weakly alkaline water and then with pure water, with the proviso that a small quantity of alkali still remains on the product, this being detected by determination of the alkali titer (ml of n/100 HCl/100 g of polymer).

The following analytical and technological characteristic data are determined on the graft PV butyral obtained:

The content of vinyl alcohol units in the graft PV butyral is 15.7% by weight, relative to the graft PV butyral, or 31.0 mol % relative to the content of vinyl alcohol units (=100 mol %) in the starting graft PVAL before the acetalization.

The alkali titer of the graft PV butyral is 109.3 ml of n/100 HCl/100 g of polymer.

Specific film properties of compressed graft PV butyral films, compression-molded at 160 bar and 95° C., such as, for example, tear strength (N/mm$^2$) and extensibility (%), cannot be determined, since the films are too fragile.

The graft PV butyral is well suited for the production of hard coatings on inflexible materials, it being possible to carry out the coating preferably by pressing-on from the polymer melt.

Example 18

The procedure followed is as in Example 17, but with the following modifications:

27.7 of butyraldehyde instead of 31.7 g are used. The content of vinyl alcohol units in the graft PV butyral obtained is 18.7% by weight instead of 15.7% by weight or 36.3 mol % instead of 31.0 mol %.

The alkali titer of the graft PV butyral is 282.1 ml of n/100 HCl/100 g of polymer instead of 109.3 ml of n/100 HCl.

The properties of compressed graft PV butyral films are similar to those of Example 17, as are the coating properties.

We claim:

1. A polymer with polyvinyl acetal groups formed by reacting an aldehyde with a graft polymer containing polyvinyl alcohol groups on a polyurethane grafting substrate.

2. A polymer as claimed in claim 1, which has been obtained by reaction with a ($C_1$–$C_{20}$)-aldehyde under acid catalysis.

3. A polymer as claimed in claim 1, which has been obtained by reaction with butyraldehyde.

4. A polymer as claimed in claim 1, for which the reaction with aldehydes was carried out in aqueous solution and/or organic solvents.

5. A polymer as claimed in claim 1, for which the reaction was carried out with an addition of acid catalysts from the group comprising hydrochloric acid, sulfuric acid, phosphoric acid and organic sulfonic acids.

6. A polymer as claimed in claim 1, for which the reaction was carried out in a water-containing medium with the addition of an anionic emulsifier from the group comprising ($C_8$–$C_{20}$)-alkanesulfonic acids, fluorinated fatty acids or fluorinated long-chain sulfonic acids and long-chain alkylsulfosuccinates.

7. A polymer as claimed in claim 1, which contains a stabilizer from the group comprising 2,4-di-tert.-butyl-p-cresol and tris-nonylphenyl phosphite.

8. A polymer as claimed in claim 19 wherein the polyurethane grafting substrate contains at least 2 urethane groups in the molecule and units from diisocyanates and optionally minor quantities of monofunctional isocyanates as well as units of diols and/or half-esterified or half-etherified diol radicals, and polymer radicals or polymer chains of units of vinyl carboxylates having 3 to 20 carbon atoms and/or hydrolysis products thereof and optionally units of further ethylenically unsaturated, polymerizable and optionally hydrolyzable and optionally copolymerized monomers and/or hydrolysis products thereof have been grafted onto the polyurethane grafting substrate, the proportion of vinyl alcohol units in the hydrolyzed or partially hydrolyzed graft polymer before the acetalization being 10% by weight relative to the hydrolyzed or partially hydrolyzed, unacetalized graft polymer.

9. A polymer as claimed in claim 1, wherein the content of residual unacetalized vinyl alcohol units in the acetalized polymer is >7.5 mol %, relative to the molar content (=100 mol %) of vinyl alcohol units in the starting graft polyvinyl alcohol before acetalization.

10. A graft polymer as claimed in claim 1, wherein the polyurethane grafting substrate contains diol units from the group comprising polyethylene glycol and 1,4-butanediol, and diisocyanate units from the group comprising isophorone diisocyanate and hexamethylene diisocyanate.

11. A polymer containing polyvinyl acetal groups, which has been obtained by acetalization of a mixture of conventional polyvinyl alcohol and a graft polymer containing polyvinyl alcohol groups on polyurethane grafting substrates, as claimed in claim 1.

12. A polymer as claimed in claim 11, which has been obtained by acetalization of a mixture of conventional polyvinyl alcohol and a graft polymer containing polyvinyl alcohol groups on a polyurethane grafting substrate, in a weight ratio from 99:1 to 1:99.

* * * * *